Patented June 6, 1950

2,510,773

UNITED STATES PATENT OFFICE 2,510,773

PROCESS FOR PREPARING A TERTIARY AMINO-ALKYL THIOL-ESTER HYDROCHLORIDE

Raymond O. Clinton, Albany, N. Y., assignor to Sterling Drug Inc., Wilmington, Del., a corporation of Delaware No Drawing. Application May 18, 1946, Serial No. 670,858

5 Claims. (Cl. 260—455)

This invention relates to alkamine esters of aromatically-substituted thiolacetic acids and salts thereof, and to processes of preparing the same. In particular it relates to processes of synthesizing said compounds which comprise reacting a basically-substituted alkanethiol with an acid halide of aromatically-disubstituted acetic acid.

My invention may be illustrated by the following equation:

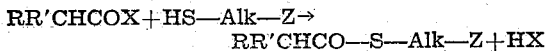

wherein R and R' are aromatic radicals, which together may form a bivalent aromatic radical, X is a halogen, preferably chlorine or bromine, Alk represents an alkylene radical and Z represents a tertiary aliphatic amino group. The elements of hydrogen halide, HX, are eliminated during the reaction. In the absence of any other acid-binding agent this resulting acid will react with the basic ester to form a salt, as follows:

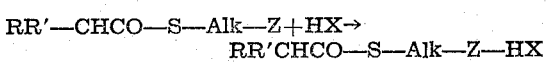

The result is a convenient process of obtaining such salts without the necessity of first isolating the basic ester and subsequently converting it to a salt. However, if the basic esters are desired or if a salt other than a hydrohalide is preferred, the acid HX may be neutralized as it is formed by the incorporation in the reaction mixture of a base such as an inorganic carbonate or bicarbonate, dilute alkali or organic bases such as pyridine or other tertiary amines.

In short, if the ester hydrohalide is desired, approximately equimolar amounts of the tertiary aminoalkanethiol and the aromatically disubstituted acetyl halide are mixed, and thereby caused to react, in the absence of any other binding agent, and preferably in an inert organic solvent. The use of any considerable excess of either reactant naturally is wasteful. On the other hand, if the basic ester is desired, approximately equimolar amounts of the tertiary aminoalkanethiol and aromatically disubstituted acetyl halide are caused to react by mixing them in contact with at least an equivalent, but preferably an excess, of an acid-binding agent.

I have found benzene to be an excellent medium for the reaction. In the cold, the salts of the basic esters are insoluble in this medium and precipitate as formed, while hot benzene is a good solvent for such salts and the compounds may be recrystallized from it in a pure form. Benzene thus serves as a reaction medium and a purification solvent. Chloroform and other lower halogenated hydrocarbons can also be used as solvents. They are, however, somewhat better solvents for the salts than benzene and therefore the recovery upon recrystallization is lower, a fact which reduces to some extent the usefulness of such solvents. Hydrocarbons having boiling points in the range of 40–100° C. are well suited for my process, particularly the hexane fraction boiling at about 60–70° C.

To obtain the basic esters, I prefer to use as solvent a mixture of chloroform and an aqueous solution of sodium bicarbonate. The organic components dissolve in the chloroform and the resulting acid, HX, is neutralized by the bicarbonate, leaving the basic ester in the organic layer. Other inert water-immiscible organic solvents may be used in place of chloroform, including halogenated hydrocarbons, aliphatic and lower aromatic hydrocarbons, ethers, and the like. A variety of other neutralizing agents are suitable as hereinabove disclosed. A useful modification consists in conducting the reaction in an inert organic solvent is the presence of an insoluble inorganic base such as an alkali or alkaline-earth metal carbonate or bicarbonate. The inorganic material is readily removed by filtration or similar method and the desired base is obtained in the organic solvent. Pyridine and tertiary organic bases such as dimethylaniline are suitable media for the reaction, acting both as solvents and as neutralizing agents. The reaction can furthermore be carried out entirely in aqueous solution in the presence of a neutralizing agent such as dilute alkali, although this method is not so convenient as that employing an insoluble, inert organic solvent in conjunction with the aqueous solution of the inorganic base, disclosed above.

The basically-substituted aliphatic mercaptans having the formula HS—Alk—Z, wherein Alk and Z have the significance given above, which are employed in my process, are synthesized by known methods from the corresponding tertiary aminoalkyl halides of the type X—Alk—Z, wherein X represents halogen. A preferred method of preparation is through the reaction of such halides with thiourea followed by hydrolysis of the resultant isothiuronium salt.

In the substituted mercaptans having the formula HS—Alk—Z, Alk represents a lower alkylene radical such as ethylene, propylene, butylene and amylene radicals. Such bivalent groups may also bear substituent radicals as, for example, the methyl group on the 1,4-butylene radical of 4-diethylamino-1-methyl-butanethiol. In the above formula, Z represents a tertiary aliphatic amino group and includes such radicals as the dialkylamino (such as dimethylamino, N-methyl-N-butylamino, and N-ethyl-N-isopropylamino), morpholino, piperidino, thiomorpholino, piperazino, pyrrolidino and related aliphatic amino groups having no free amino hydrogen atoms.

The acid halides, RR'CHCOX, are easily obtained from the known corresponding acids, RR'CHCOOH, by any of the recognized methods. In practice I have found that treatment of the acid with a phosphorus pentahalide such as phosphorus pentachloride or phosphorus pentabromide is to be preferred although other agents such as the phosphorus trihalides and the thionyl halides can be used. The substituent groups R and R' are aromatic carbocyclic radicals such as phenyl, chlorophenyl, methoxyphenyl, tolyl, naphthyl and xenyl and aromatic heterocyclic radicals such as thienyl. R and R' together may form a bivalent aromatic radical such as the o-biphenylene radical in fluorene-9-carboxylic acid, and the bivalent substituents occurring in 9,10-dihydroanthracene-9-carboxylic, xanthene-10-carboxylic and thioxanthene-10-carboxylic acids. Hence, when in the specification and appended claims, reference is made to acids or derivatives thereof, of the type RR'CHCOOH, it will be understood that the aromatic radicals R and R' include the cases wherein R and R' are connected, as in 9-fluorene-carboxylic acid, as well as where they are separate, as in diphenylacetic acid.

The products of my invention, i. e., the salts of basic esters of aromatically substituted acetic acids, are valuable antispasmodic agents. For example, 2-diethylaminoethyl diphenylthiolacetate hydrochloride has about twice the musculotropic activity of the corresponding 2-diethylaminoethyl diphenylacetate hydrochloride while its potency with regard to the less desirable neurotropic activity is considerably lower than that of the latter compound. The toxicity of this sulfur-containing ester salt is approximately equal to that of the corresponding oxygen-containing compound.

My invention is further disclosed by means of the following examples which are intended only as illustrations and which in no way limit my invention.

EXAMPLE 1

2-diethylaminoethyl diphenylthiolacetate hydrochloride

To an ice-cold solution of 13.3 g. of 2-diethylaminoethanethiol in 100 cc. of dry benzene is slowly added a solution of 23.05 g. of diphenylacetyl chloride in 200 cc. of dry benzene. The mixture is stirred 2 hours, then heated to dissolve the fine white solid that is formed. Upon cooling 31.3 g. of 2-diethylaminoethyl diphenylthiolacetate hydrochloride precipitates. It recrystallizes from a mixture of benzene and petroleum ether (B. P. 60–70° C.) as rosettes of tiny needles and melts at 129–130° C. From a mixture of absolute ethanol and ethyl acetate it recrystallizes as large, almost transparent prisms. Analysis: calculated, N, 3.84; found, N, 3.69.

EXAMPLE 2

4-diethylamino-1-methylbutyl diphenylthiolacetate citrate

A solution of 23.05 g. of diphenylacetyl chloride in 200 cc. of dry benzene is added to an ice-cold solution of 17.5 g. of 4-diethylamino-1-methylbutanethiol (B. P. 94° C. at 11 mm.; $n_D^{25}$=1.4630; prepared from 5-diethylamino-2-bromopentane hydrobromide and thiourea). After 2 hours' stirring and subsequent standing overnight, the mixture is distilled to remove the benzene. The residue is dissolved in water and treated with a slight excess of concentrated sodium hydroxide solution. The base is extracted with ether and dried over anhydrous sodium sulfate. The ether is removed and the free basic ester (28.5 g.) is distilled in vacuo; B. P. 130–135° C. (0.2–0.4 mm.). To obtain the citrate salt, 7 g. of the ester and 3.63 g. of citric acid are dissolved in 25 cc. of warm absolute alcohol. Ethyl acetate is added to the warm solution until turbidity results. On cooling crystals of 4-diethylamino-1-methylbutyl diphenylacetate citrate are formed, M. P. 86–87° C. Analysis: calculated, N, 2.49; found, N, 2.36.

EXAMPLE 3

3-piperidinopropyl diphenylthiolacetate hydrochloride 10.3 g. of 3-piperidinopropanethiol (B. P. 93° C. at 10 mm., $n_D^{20}$=1.5000; prepared from 3-piperidinopropyl chloride hydrochloride and thiourea) in 100 cc. of warm dry benzene is added with swirling to 15 g. of diphenylacetyl chloride in 100 cc. of dry benzene. There is an immediate precipitation of white crystals. These are redissolved by heating, the solution diluted to 450 cc. with petroleum ether (B. P. 60–70° C.), cooled and filtered, yielding 21.6 g. of 3-piperidinopropyl diphenylthiolacetate hydrochloride. Recrystallization from absolute ethanol and ethyl acetate gives the salt as white needles of M. P. 155–156° C. Analysis: calculated, Cl, 9.09; found, Cl, 9.09. The free base when prepared from the components and a base (preferably by the use of chloroform-aqueous sodium bicarbonate) forms white prisms from dilute alcohol, M. P. 46° C.

In a similar way, 3-diethylaminopropyl diphenylthiolacetate hydrochloride is prepared. It melts at 127–128° C. after recrystallization from a mixture of absolute alcohol, ethyl acetate and ether. Analysis: calculated, S, 8.48; found, S, 8.69.

4-diethylamino-1-methylbutyl diphenylthiolacetate hydrochloride is made by a similar method. It melts at 66–68° C. after recrystallization from a mixture of benzene and petroleum ether (B. P. 30–40° C.). Analysis: calculated, N, 7.99; found, N, 7.88.

2-diethylaminoethyl fluorene-9-thiolcarboxylate hydrochloride is prepared by the above general method, but using equimolar amounts of 2-diethylaminoethanethiol and 9-fluorenecarboxylic acid chloride. It crystallizes as needles from a mixture of absolute ethanol, ethyl acetate and petroleum ether (B. P. 28–38° C.) and melts with decomposition at 208–210° C. Analysis: calculated, S, 8.86; found, S, 8.77.

3-piperidinopropyl fluorene-9-thiolcarboxylate hydrochloride is made by the same general procedure but using equimolar amounts of 3-piperidinopropanethiol and 9-fluorene-carboxylic acid chloride. The free base crystallizes from ethyl acetate as tiny prisms melting at 143–144.5° C.

What I claim is:

1. A process for preparing a tertiary aminoalkyl diphenylthiolacetate hydrochloride having the formula $(C_6H_5)_2CHCOSAlkZ.HCl$, wherein Alk represents a lower alkylene group and Z represents an aliphatic tertiary amino radical, which comprises reacting substantially equimolar amounts of diphenylacetyl chloride and an aliphatic tertiary aminolkanethiol having the formula HSAlkZ in an inert organic solvent.

2. The process of preparing a tertiary aminoalkyl fluorene-9-thiolcarboxylate hydrochloride having the formula RCOSAlkZ.HCl, wherein R is a fluorenyl radical, Alk is a lower alkylene group and Z is an aliphatic tertiary amino radical, which comprises reacting substantially equimolar amounts of fluorene-9-carboxylic acid chloride and an aliphatic tertiary aminoalkanethiol having the formula HSAlkZ in an inert organic solvent.

3. The process for preparing 2-diethylaminoethyl diphenylthiolacetate hydochloride which comprises reacting substantially equimolar amounts of diphenylacetyl chloride and 2-diethylaminoethanethiol in an inert organic solvent.

4. The process of preparing 2-diethylaminoethyl fluorene-9-thiol-carboxylate hydrochloride which comprises reacting susbtantially equimolar amounts of fluorene-9-carboxylic acid chloride and 2-diethylaminoethanethiol in an inert organic solvent.

5. A process for preparing a tertiary aminoalkyl thiol-ester hydrochloride which comprises reacting substantially equimolar amounts of an aliphatic tertiary aminoalkanethiol having the formula HS—Alk—Z, where Alk represents a lower alkylene group and Z represents an aliphatic tertiary amino radical, and a member of the group consisting of a diphenylacetyl halide and a fluorene-9-carboxylic acid halide in an inert organic solvent.

RAYMOND O. CLINTON.

REFERENCES CITED

The following references are of record in the file of this patent:

UNITED STATES PATENTS

| Number | Name | Date |
| --- | --- | --- |
| 2,389,153 | Kendall | Nov. 20, 1945 |
| 2,390,555 | Richardson | Dec. 11, 1945 |

OTHER REFERENCES

Jones et al.: "Jour. Chem. Soc. (London)," vol. 95 (1909), pp. 1905–06.

Auwers: "Ber. deutsch. chem. Ges.," vol. 42 (1909), pp. 544–545.

"Chemical Abstracts," vol. 21 (1927), p. 3192 (abstract of an original paper by Chakravarti et al.).